No. 832,291. PATENTED OCT. 2, 1906.
T. W. BRYANT.
FISHING REEL.
APPLICATION FILED JAN. 9, 1906.
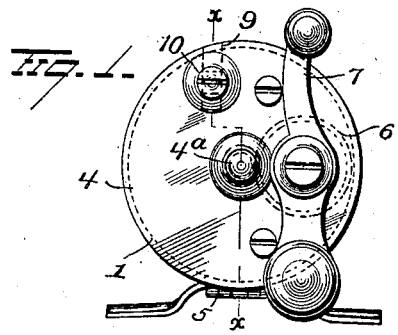
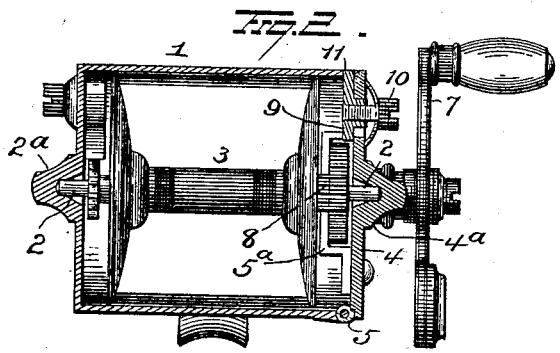
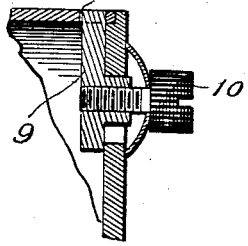
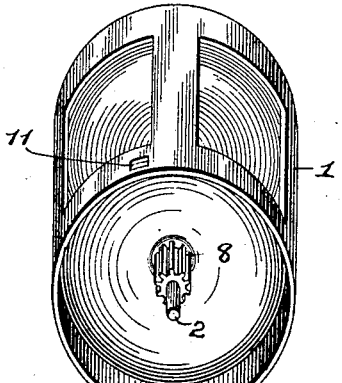
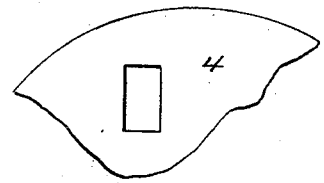
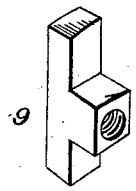
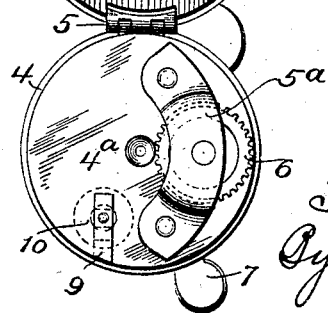
WITNESSES
E. H. Nottingham
G. F. Downing
INVENTOR
T. W. Bryant
By H. A. Seymour
Attorney

UNITED STATES PATENT OFFICE.

THOMAS WALLACE BRYANT, OF TORRINGTON, CONNECTICUT.

FISHING-REEL.

No. 832,291.　　　　Specification of Letters Patent.　　　　Patented Oct. 2, 1906.

Application filed January 9, 1906. Serial No. 295,311.

*To all whom it may concern:*

Be it known that I, THOMAS WALLACE BRYANT, a resident of Torrington, in the county of Litchfield and State of Connecticut, have invented certain new and useful Improvements in Fishing-Reels; and I do hereby declare the following to be a full, clear, and exact description of the invention, such as will enable others skilled in the art to which it appertains to make and use the same.

My invention relates to improvements in fishing-reels, the object of the invention being to provide improved mounting for the reel or spool and reel-operating mechanism which permits a head or end of the reel-casing to be moved out of the way without entirely disconnecting it from the casing and enable the operator to remove and replace the spool or reel or insert a new reel, and this movable head has a hinge or equivalent connection with the casing, so that it cannot or rather is not intended to be entirely separated from the casing, and therefore liability to misplace or drop the head is entirely obviated.

Reel-casings have heretofore been made with removable heads secured to the casing by screw-threads, bayonet-joints, and by other means, which necessitate the complete separation of head and casing to gain access to the spool or reel. The heads of such reels must be put aside while removing or replacing the reel or spool and as a result are often misplaced or dropped into the mud and water, resulting in great annoyance to the user and injury to the reel. My improvements obviate this misplacement of the head, as it is not necessary nor is it intended that the head shall be separated from the casing to remove or replace the reel or spool, for it is only necessary to swing the head out of the open end of the casing, and the head remains attached to the casing and is always in position to be returned to its normal operative position.

My invention consists in certain novel features of construction and combinations and arrangements of parts, as will be more fully hereinafter described, and pointed out in the claims.

In the accompanying drawings, Figure 1 is a view in end elevation illustrating my improvements. Fig. 2 is a view in section on the line $x\ x$ of Fig. 1. Fig. 3 is a perspective view showing the casing open. Fig. 4 is an enlarged detail view illustrating the lock for the hinged head. Fig. 5 is a fragmentary view of the head 4, showing the slot $9^b$ for the accommodation of the bolt 9.

In the reel illustrated, 1 represents a cylindrical casing having large openings in its sides and made with a closed end or fixed head, which latter is provided with a central bearing $2^a$ to receive one end of the journal or shaft 2, on which a spool or reel 3 is secured and adapted to turn within the casing, yet removable therefrom through the open end of the casing.

4 represents a casing-head having an annular groove to receive and snugly fit the open end of casing 1, or it may be otherwise made to fit the casing and is connected therewith by a hinge 5, which hinge enables the head to be swung away from the open end of the casing to allow the reel or spool to be removed and replaced without difficulty. This hinged head 4 has a central bearing $4^a$ for the end of shaft or journal 2, and a bracket $5^a$ is secured to the inner face of head 4, and between this bracket and the head a gear 6 is located and secured upon a short journal projecting through the head and having an operating crank-arm 7 thereon to turn the gear. This gear 6 when the head is closed meshes with a small pinion 8, fixed to the shaft or journal 2, so that when the gear 6 is turned by crank-arm 7 the spool or reel will be turned.

A sliding latch or bolt 9 is mounted on the head 4 and is provided with a lug $9^a$ to move in a slot $9^b$ in said head. A screw 10 enters the lug $9^a$ for moving the bolt into an opening 11 in the casing. The bolt is held in locked position by means of a spring $9^c$, disposed between the head 4 and the head of the screw.

I do not confine myself to hinging the head carrying the operating mechanism, as it is obvious that the other head may be made to open or both heads may be hinged, if desirable, and I therefore consider myself at liberty to hinge either or both heads. The particular construction of hinge connection and latch are not essential, as I might employ any form of connection between the head and casing which allows the head to be opened without entirely disconnecting it from the casing, and any form of latch or locking device may be employed. I therefore do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. The combination with a reel-casing, of a head permanently connected with the casing and supported to open and close the casing end to permit the removal of the reel or spool, said head having a bearing for the shaft of the spool, said bearing being flaring to permit the head to be swung on its hinge toward and away from the end of the shaft.

2. The combination with a reel-casing and reel-operating mechanism, of a swinging head constructed to close one end of the casing and supporting the reel-operating mechanism, and means for securing the swinging head in closed position.

3. A reel-casing having a hinged head or end, said hinged head or end having a conical journal-bearing for the shaft or journal of a spool or reel, whereby said head will be permitted to be swung on its hinge away from the shaft or journal of the spool.

4. The combination with a reel-casing having one fixed head, of a hinged head at the other end of the casing, a spool or reel, and a conical bearing in each of the heads for the journal or shaft of the spool or reel, whereby the hinged head can be swung on its hinge away from and toward the shaft of the spool to permit the latter to be removed and replaced.

5. The combination with a reel-casing having a fixed head at one end, of a hinged head at the other end of the casing, means for securing the hinged head in closed position, a removable spool or reel in the casing, a shaft or journal on which the spool or reel is secured, a bearing in each of the heads for the shaft or journal, a pinion on the shaft or journal, a gear on the hinged head to turn the pinion, and a crank-arm on the outside of this head to turn the gear.

6. The combination with a reel-casing having a fixed head at one end, of a movable head at the other end of the casing, a hinge connecting the movable head and casing, a latch to lock the movable head in closed position in the casing, said heads having conical bearings for the ends of the spool-shaft and mechanism carried by the movable head to turn a spool or reel in the casing.

7. A reel-casing having a head or end permanently connected thereto, mounted to open and close, and means carried by said head for turning a spool or reel.

8. The combination with a reel-casing having one fixed head, of a hinged head in the other end of the casing, a spool or reel, a bearing in each of the heads for the journal or shaft of the spool or reel, and mechanism mounted on the hinged head for turning the spool or reel.

9. The combination with a reel-casing having a fixed head at one end, of a hinged head at the other end of the casing means for securing the hinged head in closed position, a removable spool or reel in the casing, a shaft or journal on which the spool or reel is secured, bearings in the heads for the shaft or journal, a pinion on the shaft or journal, a gear on the hinged head to turn the pinion, and a crank-arm on the outside of the hinged head to turn the gear.

10. The combination with a reel-casing having a fixed head at one end, of a movable head at the other end of the casing, a hinge connecting the movable head and casing, a latch to lock the movable head in closed position in the casing, and mechanism carried by the movable head to turn a spool or reel in the casing.

In testimony whereof I have signed this specification in the presence of two subscribing witnesses.

THOMAS WALLACE BRYANT

Witnesses:
  DWIGHT W. POST,
  WM. H. BRONSON.